United States Patent
Deleeuw et al.

(10) Patent No.: US 9,298,718 B2
(45) Date of Patent: Mar. 29, 2016

(54) METHOD AND SYSTEM TO PLAY LINEAR VIDEO IN VARIABLE TIME FRAMES

(71) Applicants: William C. Deleeuw, Beaverton, OR (US); David I. Shaw, Portland, OR (US)

(72) Inventors: William C. Deleeuw, Beaverton, OR (US); David I. Shaw, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/629,785

(22) Filed: Feb. 24, 2015

(65) Prior Publication Data

US 2015/0339313 A1 Nov. 26, 2015

Related U.S. Application Data

(63) Continuation of application No. 13/991,559, filed as application No. PCT/US2011/067415 on Dec. 27, 2011, now Pat. No. 8,983,272.

(51) Int. Cl.
  *G11B 27/34* (2006.01)
  *G06F 17/30* (2006.01)
  *G06F 3/0484* (2013.01)
  *G06F 3/0482* (2013.01)

(52) U.S. Cl.
  CPC ........ *G06F 17/30126* (2013.01); *G06F 3/0482* (2013.01); *G06F 3/04842* (2013.01); *G06F 17/3082* (2013.01)

(58) Field of Classification Search
  None
  See application file for complete search history.

(56) References Cited

U.S. PATENT DOCUMENTS

| | | | |
|---|---|---|---|
| 2005/0154973 A1 | 7/2005 | Otsuka et al. | |
| 2007/0047917 A1 | 3/2007 | Sasaki et al. | |
| 2012/0189284 A1* | 7/2012 | Morrison | G06F 17/30265 386/282 |
| 2012/0210217 A1* | 8/2012 | Abbas | G11B 27/031 715/716 |
| 2013/0021176 A1* | 1/2013 | Tu | H04W 4/027 340/994 |

FOREIGN PATENT DOCUMENTS

EP 2077435 A1 7/2009

OTHER PUBLICATIONS

"Communication re Supplementary European Search Report" dated May 11, 2015, issued by the European Patent Office in EP Application No. MBX/P104970EP00, 7 pages.

* cited by examiner

*Primary Examiner* — Eileen Adams
(74) *Attorney, Agent, or Firm* — Buckley, Maschoff & Talwalkar LLC

(57) ABSTRACT

According to some embodiments, a method and apparatus are provided to receive a video media file, receive a chop file 200 and output a portion of the video media file based on the received chop file 200.

9 Claims, 10 Drawing Sheets

200

| Start Time | Duration | Level of Detail |
|---|---|---|
| 00:00:00 | 00:06:30 | 0 |
| 00:06:30 | 00:05:20 | 1 |
| 00:11:50 | 00:05:45 | 2 |
| 00:17:35 | 00:08:35 | 1 |
| 00:26:10 | 00:07:31 | 2 |
| 00:33:41 | 00:03:28 | 3 |
| ... | ... | ... |
| 00:45:17 | 00:10:23 | 0 |
| 00:55:40 | 00:05:30 | 1 |
| 01:01:10 | 00:02:10 | 2 |
| 01:03:20 | 00:03:41 | 2 |
| ... | ... | ... |

Columns: 201 (Start Time), 202 (Duration), 203 (Level of Detail)

FIG. 2

METHOD AND SYSTEM TO PLAY LINEAR VIDEO IN VARIABLE TIME FRAMES

BACKGROUND OF THE INVENTION

Video media, such as movies, cartoons, news programs, and documentaries, are popular forms of entertainment, and each piece of video media is associated with a pre-determined play time (e.g., run length). Most adults lead busy lives and don't always have enough time to watch an entire movie during their free time. On a 40 minute bus ride, for example, it is not currently possible to watch an entire 90 minute movie. Similarly, a child may not have enough time to watch a program before his or her bedtime. A person can "fast forward" through portions of a video file. However, assuming he or she has not already seen the video file, he or she is unaware of upcoming events and will not be able to select which portions to skip in an intelligent fashion.

BRIEF DESCRIPTION OF THE DRAWINGS

FIG. 2 illustrates a sample chop file according to some embodiments.

DETAILED DESCRIPTION OF EXAMPLE EMBODIMENTS

Figure 1:
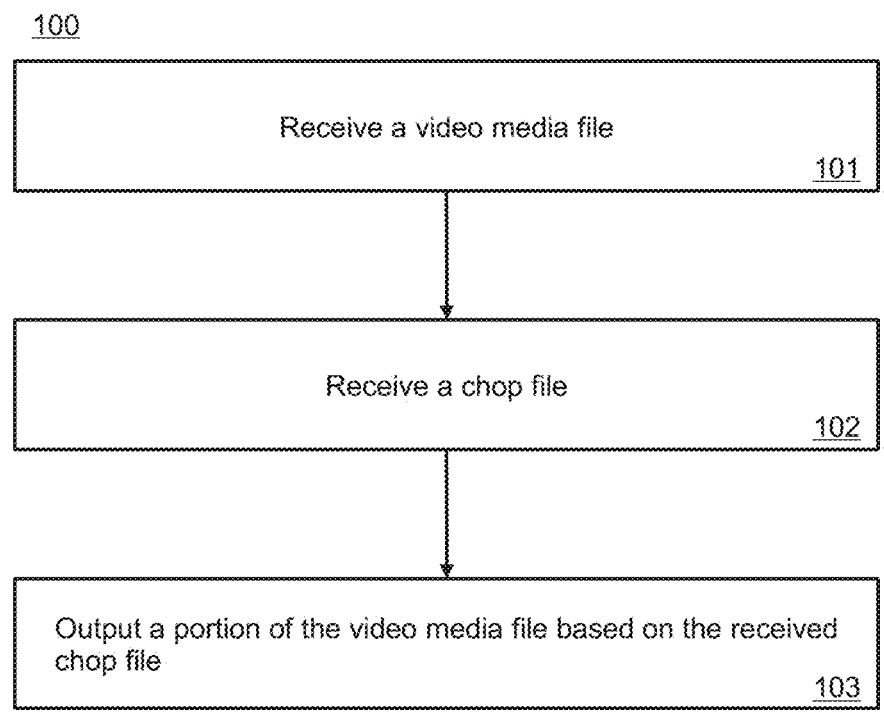
FIG. 1 illustrates a method according to some embodiments.

Referring now to FIG. 1, an embodiment of a method 100 is illustrated. The method 100 may relate to presenting a linear video, such as a movie, in various different time formats. For example, a ninety minute movie may be viewed on an hour-long road trip in a way that the movie is shown from beginning to end and includes all relevant parts so that the movie tells a complete story. The method 100 may be performed by an apparatus such as that described with respect to FIG. 3. Furthermore, the method 100 may be embodied on a non-transitory computer-readable medium that stores processor-executable instructions which can be executed by a processor.

At 101, a video media file is received. The video media file may be received from a network, a digital video disk ("DVD"), a flash drive, or other computer readable mediums. The video media file may be received at an apparatus capable of playing or outputting the content contained in the video media file, such as, but not limited to, the apparatus of FIG. 3.

For illustrative purposes, and to aid in understanding features of the specification, an example will now be introduced. This example is not intended to limit the scope of the claims. For example, a user places a DVD of a Christmas movie into a DVD player located in his motor vehicle.

Next, at 102, a chop file is received. The chop file may be a separate file from the video media file. The chop file may contain information that represents a video media file decomposed into levels of details. Now referring to FIG. 2, an embodiment of a chop file 200 is illustrated. Information contained in the chop file 200 may represent the video media file decomposed into video segments where each video segment comprise a start time 201 of a video segment, a duration of the video segment 202, and a level of detail 203 of the video segment.

A video media file may be thought of as an information fractal that contains new information at many different levels (e.g., video segments). At a highest level, the video media file consists of acts and each act can be broken down into different scenes, and each scene can be broken down into sub-scenes. As illustrated in FIG. 2, the start of each scene may be indicated as a level of detail of 0. Each sub-scene may be indicated as having a level of detail of 1, each sub-sub-scene may be indicated as having a level of detail of 2 and each sub-sub-sub scene may be indicated as having a level of detail of 3. While four levels of detail are illustrated in chop file 200, any number of levels of detail may be indicated.

The chop file 200 may be created by someone with an interest in paraphrasing a video media file. Since different people will have different interpretations and/or viewpoints about a given video media file (e.g., a movie, the news, etc.) different chops might exist with different perspectives. The chop file 200 may describe the various scenes and associated sub-scenes, selected by the chop author, in a hierarchy that defines the video media file at different detail resolution (run lengths). Chop files for various media files may be published and a chop enabled media player may receive or automatically download a chop file for a given piece of media based on various criteria, such as, but not limited to, a chop author, a favorite news outlet, a video subscription service, etc.

In some embodiments, a level of video detail is received. For example, a video detail level of 1 or 2 may be received at a chop enabled media player. In response to receiving a level of detail, a time length of the video media may be determined, and in some embodiments automatically adjusted, based on the received level of video detail and the chop file. Furthermore, a portion of the video media file to be output based the received level of detail and the chop file may be determined A selection of a level of detail may include all sub levels of the selected level for playback.

In other embodiments, a time indication may be received and in response to receiving the time indication a run length of the video media file may be automatically adjusted based on the received time indication and the chop file. Furthermore, a portion of the video media file to be output based the received time indication and the chop file may be determined In some embodiments, the run length may be adjusted based on a combination of different levels of detail. For example, in response to receiving the time indication, a length of the video media file to be played back will be determined based on a combination of a first period of time associated with a first level of video detail and on a second period of time associated with a second level of video detail such that a total time equals the time indication.

Continuing with the above example, the user who placed the Christmas movie into the DVD player also loads a chop file into the DVD player. The chop file may be loaded via the internet (e.g., a wireless or wired internet connection), flash drive, or other portable computer readable medium. Furthermore, the DVD player may receive a level of detail of 2.

Next, at 103 a portion of the video media file is output based on the received chop file. The video media file may be output to a display or monitor. Video segments of the video media file associated with the selected level of detail and lower will be output and displayed.

Continuing with the above example, the Christmas movie is output to a display based on the times set forth in the chop file and on the received level of detail (e.g., 2). Therefore only sections of the Christmas movie associated with levels 2, 3 and lower will be played and displayed on the DVD player.

In other embodiments, a level of detail may be controlled by other systems, such as a global positioning system ("GPS"). The GPS may determine a time to arrive at a destination and transmit that time to the chop enabled media player. In response to receiving the time to arrive from the GPS, the chop enabled media player may adjust the output based on the chop file so that viewing of the video media file will be completed when the user arrives at his location. Moreover, should the GPS determine delays in arrival (e.g., due to traffic or construction), the GPS can send a modified time indication to the chop enabled media player to increase viewing time. As such, levels of detail may be automatically adjusted to ensure that viewing is concluded at a specific time.

In another embodiment, when a time indication exceeds a total length of the video media file, additional media related to the video media file may be output. The additional media may be downloaded from the internet, an external medium (e.g., flash drive) or may be associated with the video media file such as, but not limited to, a director's cut, a behind the scenes look, artist interviews.

Figure 3:
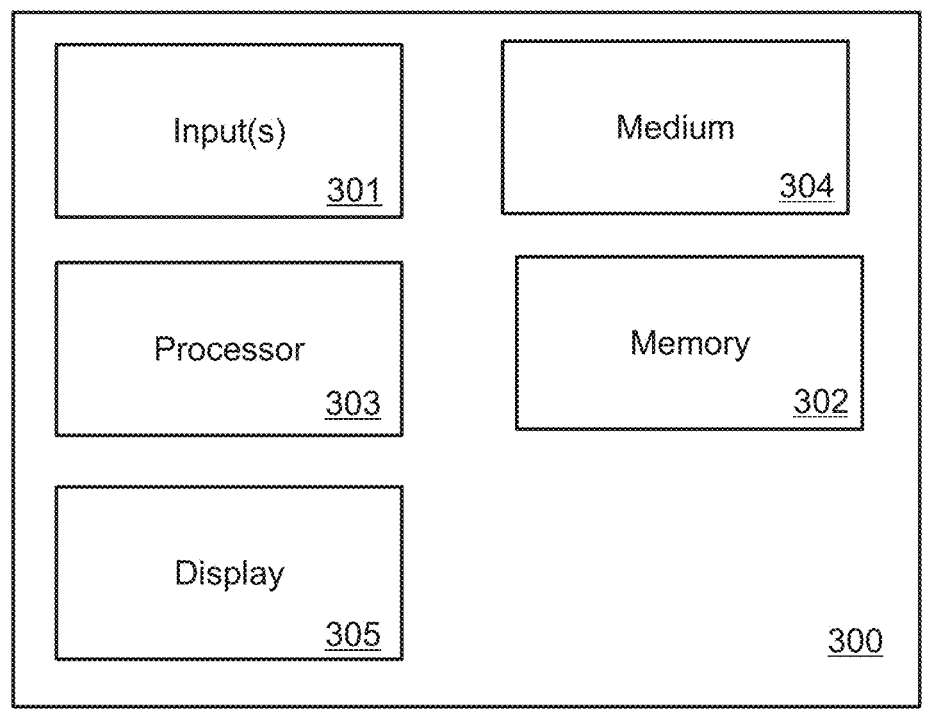
FIG. 3 illustrates an apparatus according to some embodiments.

Now referring to FIG. 3, an embodiment of an apparatus 300 is illustrated. The apparatus 300 may comprise one or more inputs 301, a memory 302, a processor 303, a medium 304, and a display 305.

The one or more inputs 301 may comprise, but are not limited to, of a keyboard, a touch screen, a dial, a GPS, a slider or other imputing means. In some embodiments the input may comprise a level of detail dial. The level of detail dial may be used to enter a level of detail to dynamically cause detail to be successively removed as the level of detail dial is turned down or added as the "level of detail" dial is turned up. In some embodiments, the apparatus 100 may display a run time of the video media file that is associated with the entered level of detail. The level of detail may be dynamically controlled so that more detail is presented for portions which are of most interest and less detail is presented during less interesting parts. Furthermore, in some embodiments the level of detail may be automatically adjusted to cause the video to end at a desired time. When the level of detail dial is turned up, media scenes successively higher in the chop's hierarchy are displayed and accordingly, when the detail dial is turned down, media scenes successively lower in the chop file hierarchy will be displayed. The detail dial may be exercised in real-time by the user while watching a piece of media, allowing the viewer to "drill down" on content that most interests them.

The processor 303 may include or otherwise be associated with dedicated registers, stacks, queues, etc. that are used to execute program code and/or one or more of these elements may be shared there between. In some embodiments, the processor 303 may comprise an integrated circuit. The processor 303 may comprise circuitry to perform a method such as, but not limited to, the method described with respect to FIG. 1.

The medium 304 may comprise any computer-readable medium that may store processor-executable instructions to be executed by the processor 303. For example, the medium 304 may comprise a non-transitory tangible medium such as, but is not limited to, a compact disk, a digital video disk, flash memory, optical storage, random access memory, read only memory, or magnetic media.

The memory 302 may comprise any type of memory for storing data, such as, but not limited to, a Secure Digital (SD) card, a micro SD card, a Single Data Rate Random Access Memory (SDR-RAM), a Double Data Rate Random Access Memory (DDR-RAM), or a Programmable Read Only Memory (PROM).

Figure 4:
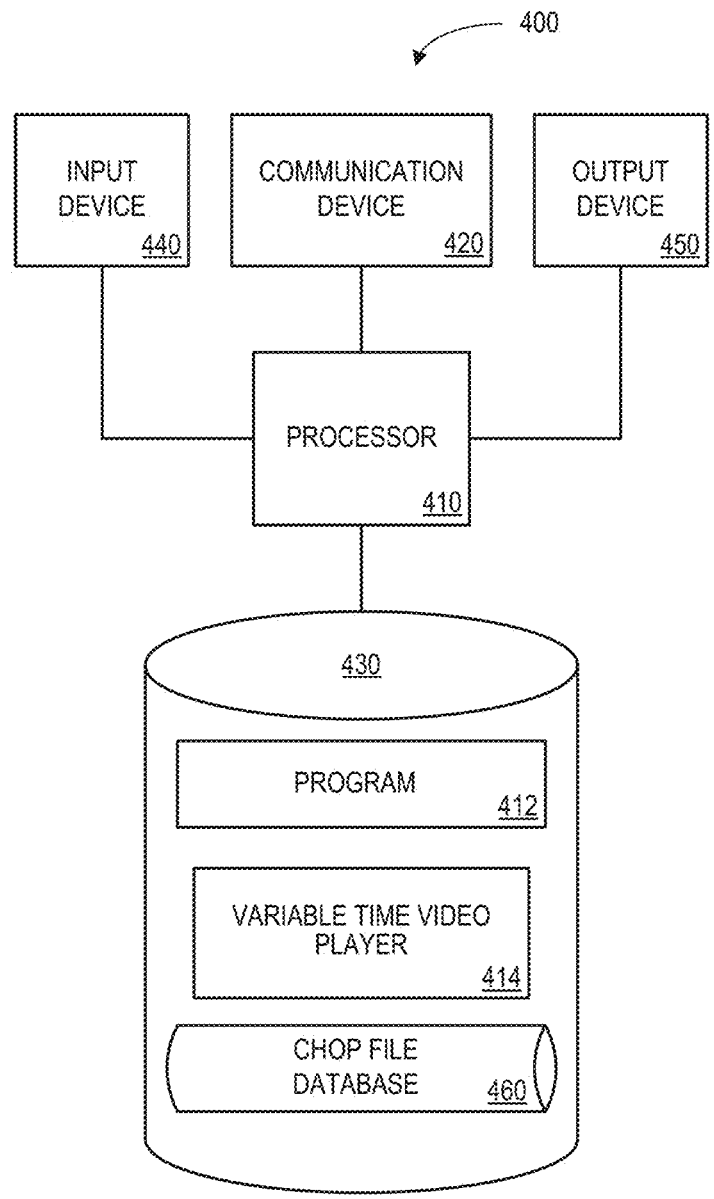
FIG. 4 is a block diagram of a variable time video player in accordance with some embodiments.

FIG. 4 is a block diagram overview of a variable time video player 400 according to some embodiments. The variable time video player 400 comprises a processor 410, such as one or more commercially available Central Processing Units (CPUs) in the form of one-chip microprocessors, coupled to a communication device 420 configured to communicate via a communication network (not shown in FIG. 4). The communication device 420 may be used to communicate, for example, with one or more remote servers as described with respect to FIG. 7. The variable time video player 400 further includes an input device 440 (e.g., a motion sensor, touch-screen, and/or keyboard to receive information from a user who creates a chop file) and an output device 450 (e.g., a computer monitor to display a video file to a user).

The processor 410 communicates with a storage device 430. The storage device 430 may comprise any appropriate information storage device, including combinations of magnetic storage devices (e.g., a hard disk drive), optical storage devices, and/or semiconductor memory devices. The storage device 430 stores a program 412 and/or variable time video player application 414 for controlling the processor 410. The processor 410 performs instructions of the programs 412, 414, and thereby operates in accordance with any of the embodiments described herein. For example, the processor 410 may receive a video media file associated with a plurality of time-based portions. The processor 410 may also receive a chop file, the chop file including a level of video detail indication for each of the plurality of time-based portions. The processor 410 may then output a portion of the video media file based on the received chop file.

The programs 412, 414 may be stored in a compressed, uncompiled and/or encrypted format. The programs 412, 414 may furthermore include other program elements, such as an operating system, a database management system, and/or device drivers used by the processor 410 to interface with peripheral devices.

As used herein, information may be "received" by or "transmitted" to, for example: (i) the variable time video player 400 from another device; or (ii) a software application or module within the variable time video player 400 from another software application, module, or any other source.

According to some embodiments, the storage device 430 further stores a chop file database 460. The chop file database 460 might be, for example, created or adjusted by a viewer via the input device 440 and/or received from a remote chop file server via the communication device 420. The information in the chop file database 460 might be, for example, similar to the information described with respect to FIG. 2.

Figure 5:
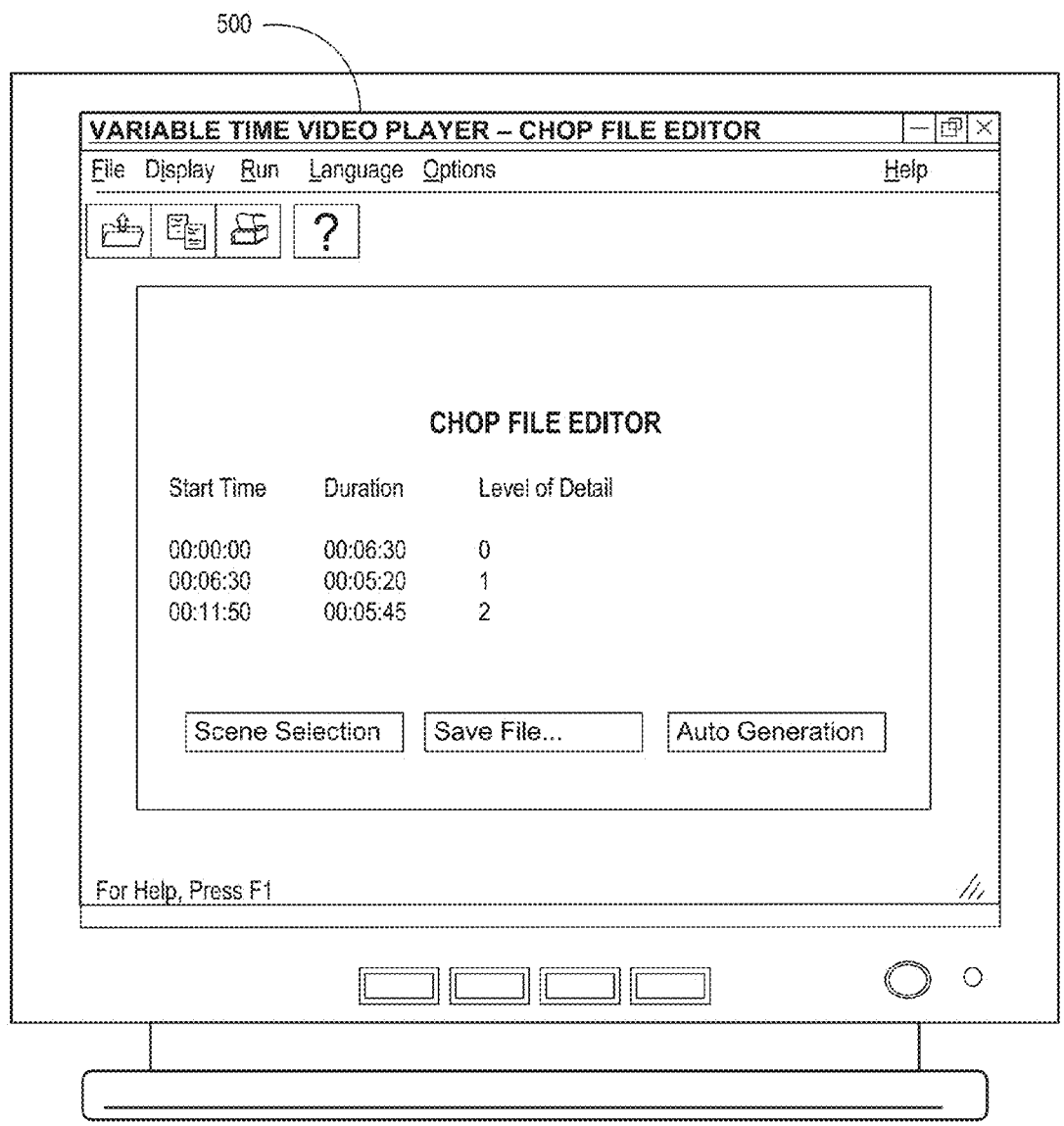
FIG. 5 illustrates a variable time video player user interface according to some embodiments.

FIG. 5 illustrates a variable time video player user interface 500 according to some embodiments. The user interface 500 may, for example, let a viewer enter and/or adjust chop file information associated with a movie or other video file (e.g., a start time, a duration or stop time, and a level of detail value for various portions of the movie). According to some embodiments, a user may select an "auto generation" icon to have a variable time video player automatically create or suggest chop file information.

Figure 6:
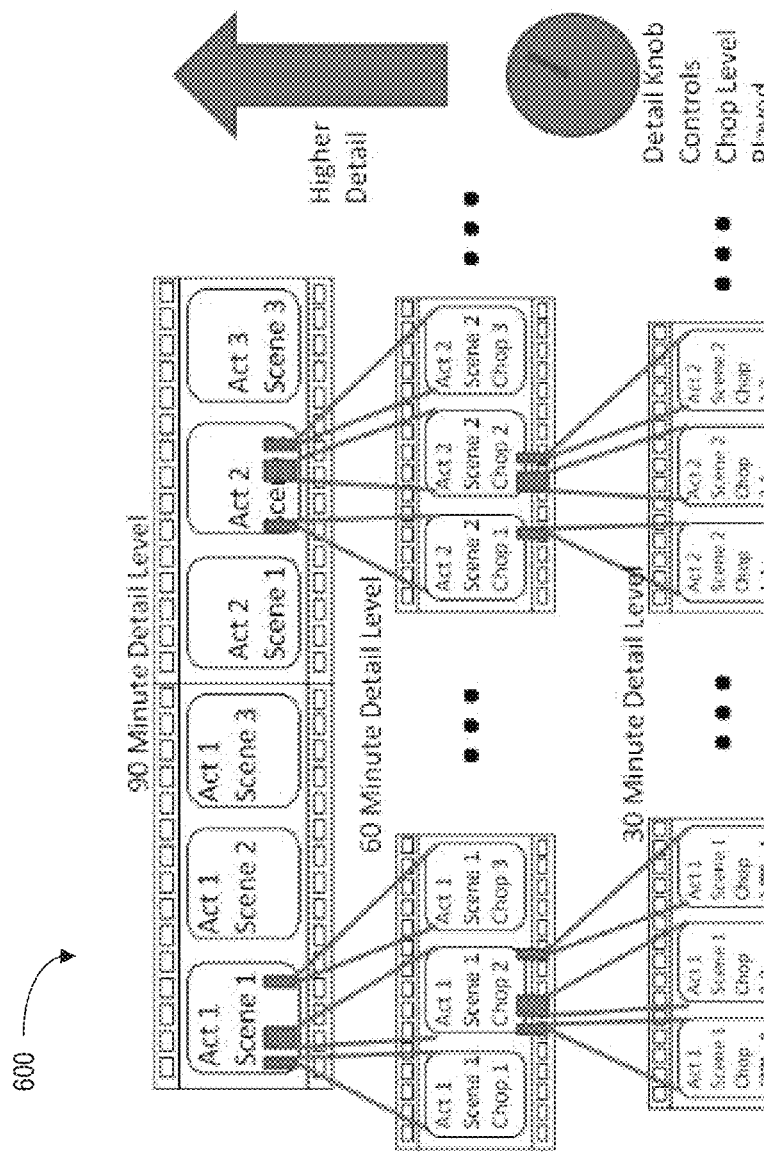
FIG. 6 is an example of various detail levels associated with a variable time video player in accordance with some embodiments.

FIG. 6 is an example 600 of various detail levels associated with a variable time video player in accordance with some embodiments. For example, a 90 minute detail level may include acts and scenes which may map to chops in a 60 minute detail level. Similarly, chops in the 60 minute detail level may map to sub-chops in a 30 minute detail level. A detail knob (physical or graphical) might let a view control which chop levels are played.

Figure 7:
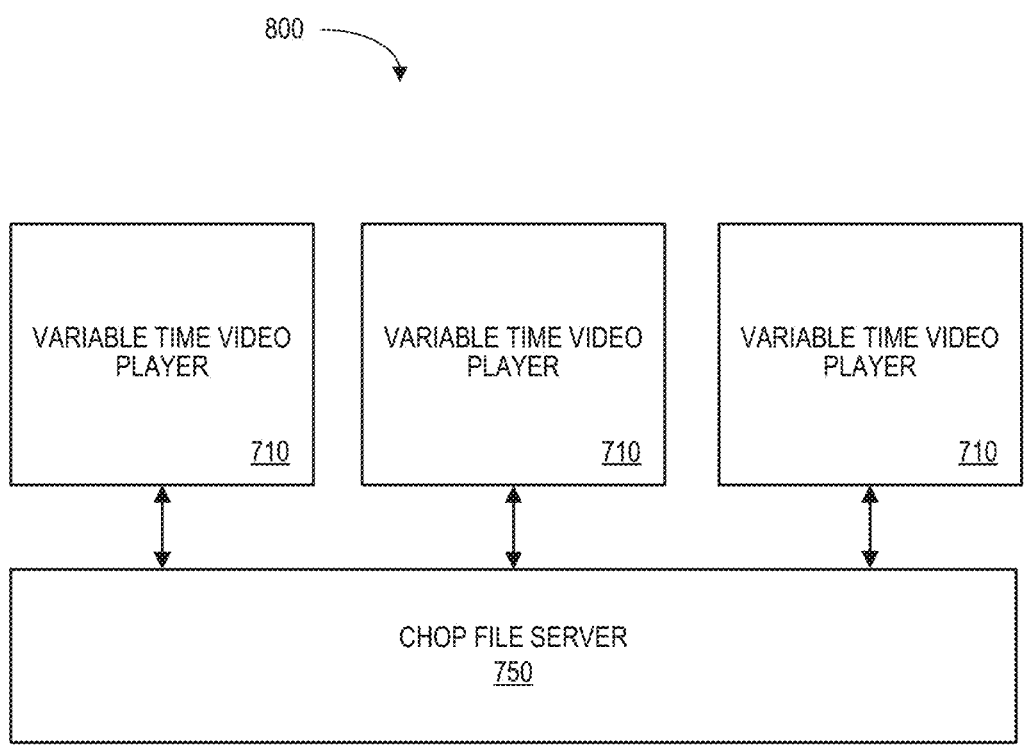
FIG. 7 is a block diagram of a network in accordance with some embodiments.

FIG. 7 is a block diagram of a network 700 in accordance with some embodiments. In the network 700, a chop file server 750 may exchange chop file information with a plurality of variable time video players 710. The chop file server 750 might, for example, receive requests for chop files from a variable time video player 710 (e.g., including a movie title or identifier) and reply to the request with the appropriate information.

Figure 8:
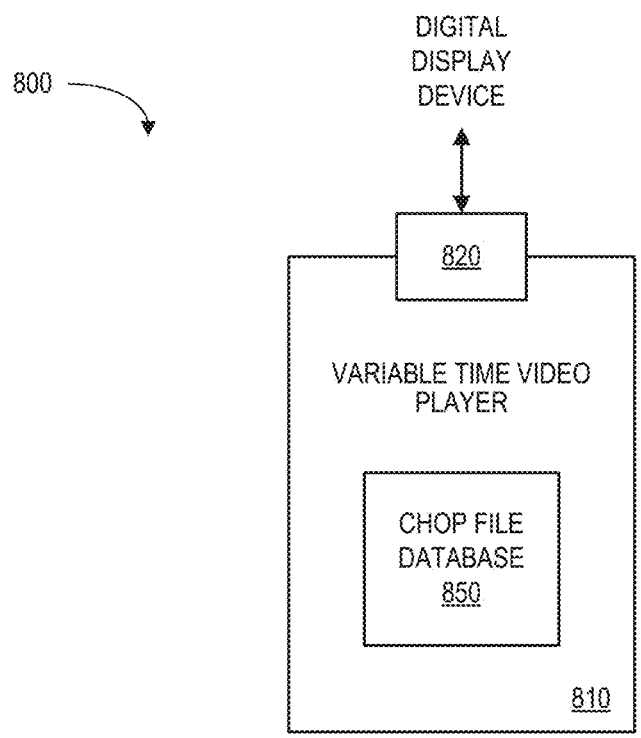
FIG. 8 illustrates a system according to some embodiments.

FIG. 8 illustrates a system 800 according to some embodiments. In particular, the system 800 comprises a variable time video player 810, storing a chop file database 850, that operates in accordance with any of the embodiments described herein. According to some embodiments, the variable time video player 810 further includes a digital display port 820 to exchange information with a digital display device (e.g., a television or set top box).

Figure 9:
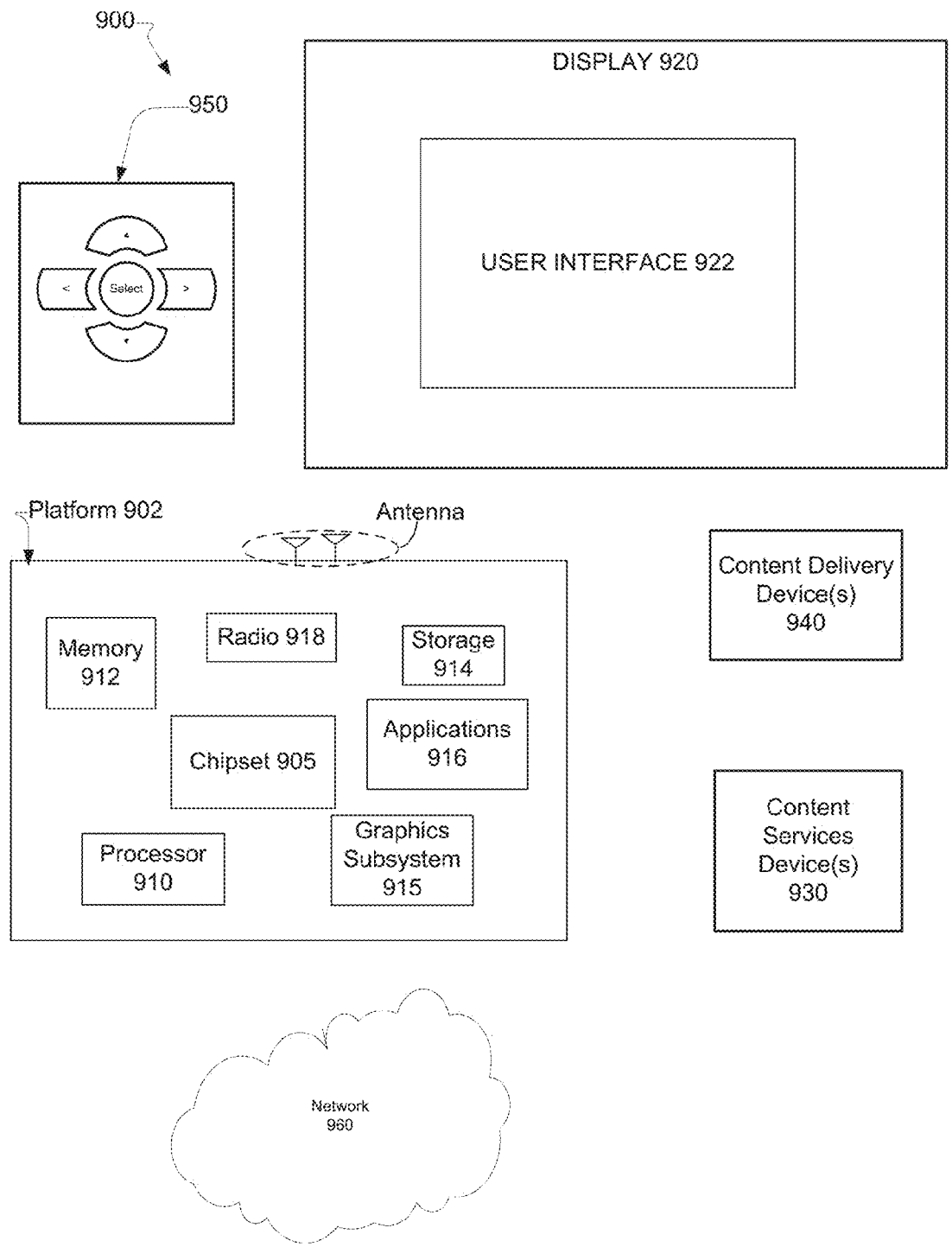
FIG. 9 illustrates another system in accordance with some embodiments.

FIG. 9 illustrates an embodiment of a system 900. In embodiments, system 900 may be a media system although system 900 is not limited to this context. For example, system 900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 900 comprises a platform 902 coupled to a display 920. Platform 902 may receive content from a content device such as content services device(s) 930 or content delivery device(s) 940 or other similar content sources. A navigation controller 950 comprising one or more navigation features may be used to interact with, for example, platform 902 and/or display 920. Each of these components is described in more detail below.

In embodiments, platform 902 may comprise any combination of a chipset 905, processor 910, memory 912, storage 914, graphics subsystem 915, applications 916 and/or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 910 may comprise dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 914 may comprise technology to increase the storage performance enhanced protection for valuable digital media when multiple hard drives are included, for example.

Graphics subsystem 915 may perform processing of images such as still or video for display. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, DisplayPort, wireless HDMI, and/or wireless HD compliant techniques. Graphics subsystem 915 could be integrated into processor 910 or chipset 905. Graphics subsystem 915 could be a stand-alone card communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 918 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In embodiments, display 920 may comprise any television type monitor or display. Display 920 may comprise, for example, a computer display screen, touch screen display, video monitor, television-like device, and/or a television. Display 920 may be digital and/or analog. In embodiments, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In embodiments, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In embodiments, content services device(s) 930 may comprise a cable television box, personal computer, network, telephone, Internet enabled devices or appliance capable of delivering digital information and/or content, and any other similar device capable of unidirectionally or bidirectionally communicating content between content providers and platform 902 and/display 920, via network 960 or directly. It will be appreciated that the content may be communicated unidirectionally and/or bidirectionally to and from any one of the components in system 900 and a content provider via network 960. Examples of content may include any media information including, for example, video, music, medical and gaming information, and so forth.

Content services device(s) 930 receives content such as cable television programming including media information, digital information, and/or other content. Examples of content providers may include any cable or satellite television or radio or Internet content providers. The provided examples are not meant to limit embodiments of the invention.

In embodiments, platform 902 may receive control signals from navigation controller 950 having one or more navigation features. The navigation features of controller 950 may be used to interact with user interface 922, for example. In embodiments, navigation controller 950 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 950 may be echoed on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922, for example. In embodiments, controller 950 may not be a separate component but integrated into platform 902 and/or display 920. Embodiments, however, are not limited to the elements or in the context shown or described herein.

In embodiments, drivers (not shown) may comprise technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 when the platform is turned "off" In addition, chip set 905 may comprise hardware and/or software support for 5.1 surround sound audio and/or high definition 9.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various embodiments, platform 902 and display 920 may be an integrated unit. Display 920 and content service device(s) 930 may be integrated, or display 920 and content delivery device(s) 940 may be integrated, for example. These examples are not meant to limit the invention.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
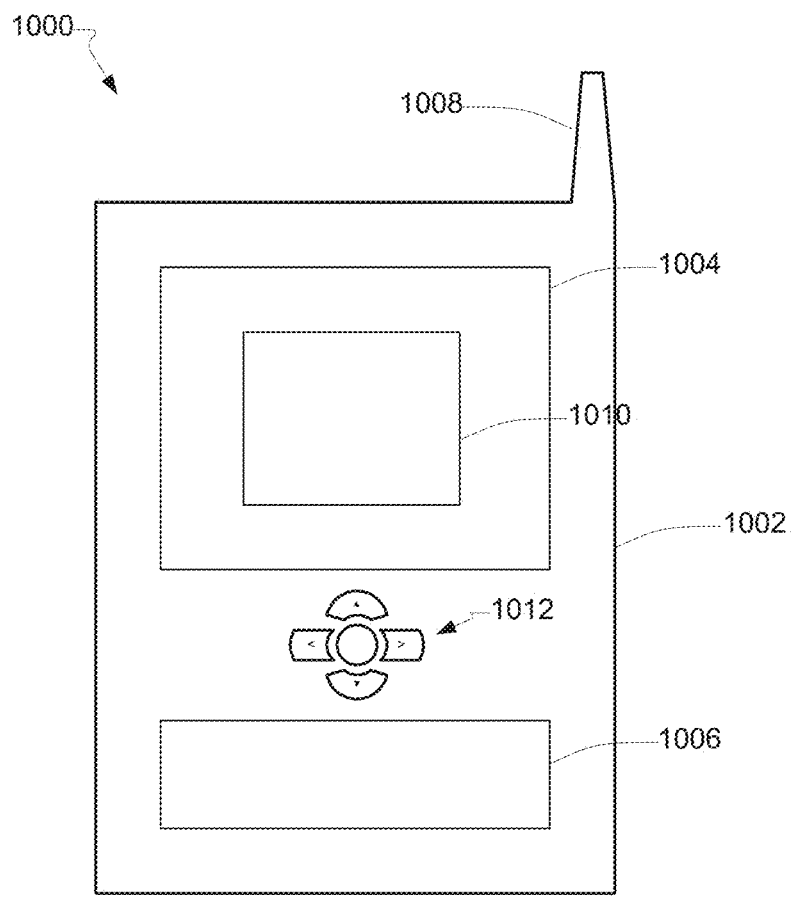
FIG. 10 is an example of a small form factor device in accordance with some embodiments.

As described above, system 900 may be embodied in varying physical styles or form factors. FIG. 10 illustrates embodiments of a small form factor device 1000 in which system 900 may be embodied. In embodiments, for example, device 1000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, device 1000 may comprise a housing 1002, a display 1004, an input/output (I/O) device 1006, and an antenna 1008. Device 1000 also may comprise navigation features 1012. Display 1004 may comprise any suitable display unit for displaying information appropriate for a mobile computing device. I/O device 1006 may comprise any suitable I/O device for entering information into a mobile computing device. Examples for I/O device 1006 may include an alphanumeric keyboard, a numeric keypad, a touch pad, input keys, buttons, switches, rocker switches, microphones, speakers, voice recognition device and software, and so forth. Information also may be entered into device 1000 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various modifications and changes may be made to the foregoing embodiments without departing from the broader spirit and scope set forth in the appended claims. The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although embodiments have been described with respect to particular types of video files, note that embodiments may be associated with other types of information. For example, a digital book or audio file might be associated with a chop file. Moreover, while embodiments have been illustrated using particular ways of selecting a level of detail, note that embodiments might be associated with other ways of determining detail levels (e.g., by automatically detecting that a person is not paying attention to the current level of detail).

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method comprising:
    receiving a video media file comprising a first time-based portion divided into a plurality of sub-portions;
    receiving a chop file, comprising a start time associated with each of the plurality of sub-portions, a duration associated with each of the plurality of sub portions, and a level of detail associated with each of the plurality of sub portions;
    outputting, via a processor, a portion of the video media file based on a time to arrive at a destination, the start time, the duration and the level of detail associated with each of the plurality of sub portions as indicated by the received chop file, wherein in response to receiving the time to arrive at the destination, a length of the portion of the video media file is adjusted so that the outputting of the portion of the video media file will be completed at an arrival at the destination; and
    in a case that a global positioning system determines a delay in the arrival, a length of the portion of the video media file is increased so that the outputting of the portion of the video media file will be completed based on the delay in the arrival at the destination.

2. The method of claim 1, wherein the time to arrive at a destination is determined by the global positioning system.

3. The method of claim 1, wherein increasing a length of the portion of the video media files is based on adjusting the level of detail associated with each of the plurality of sub portions.

4. A system comprising:
    a processor; and
    a medium comprising instructions that when executed by the processor perform a method, the method comprising:
    receiving a video media file comprising a first time-based portion divided into a plurality of sub-portions;
    receiving a chop file, comprising a start time each of the plurality of sub-portions, a duration of each of the plurality of sub portions, and a level of detail of each of the plurality of sub portions;
    outputting, via the processor, a portion of the video media file based on a time to arrive at a destination, the start time, the duration and the level of detail associated with each of the plurality of sub portions as indicated by the received chop file, wherein in response to receiving the time to arrive at the destination, a length of the portion of the video media file is adjusted so that the outputting of the portion of the video media file will be completed at an arrival at the destination, and
    in a case that a global positioning system determines a delay in the arrival, a length of the portion of the video media file is increased so that the outputting of the portion of the video media file will be completed based on the delay in the arrival at the destination.

5. The system of claim 4, wherein the time to arrive at a destination is determined by the global positioning system.

6. The system of claim 4, wherein increasing a length of the portion of the video media files is based on adjusting the level of detail associated with each of the plurality of sub portions.

7. A non-transitory computer readable medium comprising instructions that when executed by a processor perform a method, the method comprising:
    receiving a video media file comprising a first time-based portion divided into a plurality of sub-portions;

receiving a chop file, comprising a start time each of the plurality of sub-portions, a duration of each of the plurality of sub portions, and a level of detail of each of the plurality of sub portions;

outputting, via the processor, a portion of the video media file based on a time to arrive at a destination, the start time, the duration and the level of detail associated with each of the plurality of sub portions as indicated by the received chop file, wherein in response to receiving the time to arrive at the destination, a length of the portion of the video media file is adjusted so that the outputting of the portion of the video media file will be completed at an arrival at the destination; and in a case that a global positioning system determines a delay in the arrival, a length of the portion of the video media file is increased so that the outputting of the portion of the video media file will be completed based on the delay in the arrival at the destination.

8. The non-transitory computer readable medium of claim 7, wherein the time to arrive at a destination is determined by the global positioning system.

9. The non-transitory computer readable medium of claim 7, wherein increasing a length of the portion of the video media files is based on adjusting the level of detail associated with each of the plurality of sub portions.

* * * * *